United States Patent [19]

Reitberger et al.

[11] 4,323,905

[45] Apr. 6, 1982

[54] INK DROPLET SENSING MEANS

[75] Inventors: Peter H. Reitberger, Munich; Helmut Weber, Augsburg, both of Fed. Rep. of Germany

[73] Assignee: NCR Corporation, Dayton, Ohio

[21] Appl. No.: 209,088

[22] Filed: Nov. 21, 1980

[51] Int. Cl.[3] ............................................ G01D 15/18

[52] U.S. Cl. ..................................................... 346/75

[58] Field of Search ................. 346/75, 140 R, 140 IJ, 346/140 PD

[56] References Cited

U.S. PATENT DOCUMENTS 4,012,745 3/1977 Brown et al. ..................... 346/75 X
4,067,019 1/1978 Fleischer et al. ..................... 346/75
4,128,841 12/1978 Brown et al. ......................... 346/75

*Primary Examiner*—L. T. Hix
*Assistant Examiner*—W. J. Brady
*Attorney, Agent, or Firm*—J. T. Cavender; Wilbert Hawk, Jr.; George J. Muckenthaler

[57] ABSTRACT

An ink droplet sensing means for detecting whether or not droplets are impinging on record media during ink jet printing operations. A synthetic foil having a metal layer is placed over a counter electrode having a rough surface on one side and a voltage is then applied to the electrode and the metal layer. Ink droplets impinging on the foil momentarily deflect the foil and cause a change in capacity which in turn causes a voltage change at the electrode. The voltage change is coupled through a capacitor and an amplifier and through recognition logic for evaluation of the signals.

15 Claims, 11 Drawing Figures

INK DROPLET SENSING MEANS

BACKGROUND OF THE INVENTION

In the field of non-impacting printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members such as wires or the like and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both correct and high-speed printing.

In the matter of ink jet printing, it may be extremely useful to make certain that a clean printed character results from the ink droplets. Several of the problems which have been encountered relate to the existence of the ink droplet, the position of the droplet, the size of the droplet and the property or condition of the ink spot on the record media.

It is therefore proposed to observe the printing operation of an ink jet printer by means of sensing or detecting the depositing of the ink droplets on the paper.

Representative prior art in the field of sensing or detecting printed indicia includes German specification No. 2,617,902, to J. Gross and opened to the public on Nov. 3, 1977. This publication discloses an error indicating device for a wire printer and which includes force sensing means in the platen and responsive to the impact of print wires and then providing signals for interrupting the printing operation.

German specification No. 2,816,542, to T. Ota, opened to the public on Oct. 26, 1978 and corresponding to U.S. Pat. No. 4,184,781, discloses force sensing elements in the platen of a dot printer. A drive mechanism drives each dot printing element when the printing elements come to rest on the opposite side of the sensing elements and force errors of each printing element are determined by decreases in the force sensing output signals generated by the drive of the printing elements.

U.S. Pat. No. 3,465,350, issued to R. I. Keur et al. on Sept. 2, 1969, discloses an arrangement for providing test video signals for charging ink drops and detecting whether the drops are properly charged by placing an ink drop detector in the nature of piezoelectric material at the location to which they should be deflected if properly charged. If the ink drop detector does not detect drops, the phase of the formation of the ink drops is shifted to correct the condition.

U.S. Pat. No. 3,562,761, issued to J. J. Stone on Feb. 9, 1971, discloses drop phasing in ink drop writing apparatus wherein ink emitted by the nozzle is in the form of ink drops which are charged in a tunnel in response to video signals and means are provided for sensing whether or not the ink drops are made to occur with the proper phase to assume the proper charge and, if this is not true, to correct the phase of the vibration of the nozzle whereby the ink drop phasing and charging are corrected.

U.S. Pat. No. 3,761,941, issued to J. A. Robertson on Sept. 25, 1973, discloses phase control for a drop generating and charging system wherein charged drops pass through an electrical deflection field into a catcher, and drops which are uncharged pass undeflected through the field and onto a recording sheet. During non-recording times, a calibrating signal is applied to the charging electrode and the charge is measured by an electrometer. This measurement indicates the phase of drop generation relative to the phase of the calibrating signal and deviations of this relative phase from a desired phase are corrected by adjusting the amplitude of the drop stimulating disturbance applied to the ink jet.

U.S. Pat. No. 3,810,194, issued to K. Tokunaga et al. on May 7, 1974, discloses a device for generating a pulse in response to a droplet formation or movement to synchronize the operation of a deflection means or a pattern generating means of the printer with the pulse from the droplet detecting means. The ink droplet detecting means has an electroconductive plate and a resistor through which the plate is connected to a voltage supply.

U.S. Pat. No. 3,886,564, issued to H. E. Naylor et al. on May 27, 1975, discloses deflection sensors for ink jet printers positioned in a test location downstream from the nozzle means and in proximity to the test path and positioned for sensor coupling with ink drops proceeding in the test path. The sensor means comprises a pair of sensor plates separated by a reference gap located adjacent the test path wherein passage of ink drops induces signals representative of charges on the drops in the sensor plates due to coupling between drops and the sensor plates.

U.S. Pat. No. 3,977,010, issued to B. T. Erickson et al. on Aug. 24, 1976, discloses a dual sensor for a multi-nozzle ink jet comprising electrically-conductive sensing means disposed on opposite sides of the ink drop streams and electrically conductive shielding means disposed fore and aft of the sensing means and current amplification means connected to each sensing means. Measurements are made on a jet stream to sense ink droplet alignment, droplet arrival time, charge electrode operation, and charge phasing.

U.S. Pat. No. 4,067,019, issued to J. M. Fleischer et al. on Jan. 3, 1978, discloses a sensing arrangement for accurately detecting the position of ink jet drop impact on the surface of a flat piezoelectric between two parallel conductors. A localized charge generated in the piezoelectric generates a signal in each conductor dependent upon the distance of the impact location from the conductor.

U.S. Pat. No. 4,129,875, issued to S. Ito et al. on Dec. 12, 1978, discloses phase control for an ink jet printer which uses a detector circuit for detecting the relation between the generation of an ink droplet and the phase of a charging signal on the basis of an output signal of a sensor. A phase shift circuit matches the generation of the ink droplet and the phase of the charging signal and an inhibit circuit inhibits the phase shift circuit from operating for a predetermined period of time.

And, U.S. Pat. No. 4,176,363, issued to T. Kasahara on Nov. 27, 1979, discloses ink jet printing apparatus wherein the print head is shifted to an ink failure preventive ejection position distal from the printing region and has a timer for generating a signal and a detector for detecting the setting of the print head at the ejection position.

SUMMARY OF THE INVENTION

The present invention relates to ink jet printing and, more particularly to an ink droplet sensing means or supervising system for observing or sensing the formation of ink droplets on paper or like record media. It is not uncommon by reason of the fluid characteristics of ink and the high speed of the driven ink droplets that the above-mentioned problems or troubles can and do exist in the ink jet printing operations. It is therefore believed that the present invention includes subject matter which eliminates or at least minimizes the problems in ink jet printing.

The existence of an ink mark or spot and then the non-existence of an ink spot on the paper may indicate that the nozzle plate of the ink jet print head requires cleaning or rinsing. Secondly, the actual position of the ink mark may be different from the desired postion and this condition may be caused by an improper delay time or an incorrect speed of the ink droplet relative to the speed of the moving print head or like device. A third problem or trouble area may be that the actual size of the ink spot or mark on the paper does not correspond with the desired ink spot size and wherein the ink droplet drive means may require an adjustment in the operation thereof. Additionally, the precise optical properties of the ink spot in regard to the contrast or reflection characteristic may not be within the scope of the specification, and the driving condition can then be altered to correct the condition or the composition of the ink may be changed to correct for contrast or reflection quality.

In accordance with the present invention, an ink jet print head or like device is caused to be moved in side-to-side manner and the ink in the print head is controlled by means of a drive circuit to cause ink droplets to be ejected through a nozzle and onto the paper or like record media.

The sensing means is preferably an electrostatic sensing unit positioned in relation to the printing element or print head and capable of detecting the ink droplet prior to placing an ink mark or spot on the paper. While the sensing means may be positioned in horizontal manner on one side with respect to the printing element, there may be sensing means on either side of the printing element, or the sensing means may be located in an arrangement beyond the width of the paper but in a position to be reached by the printing element when moving in side-to-side manner.

The sensing means detects small ink droplets and includes an electrode which has an uneven surface across which is tightened or stretched synthetic foil having a layer or coating of metal thereon. A direct voltage is applied between the metal layer and the electrode and whenever ink droplets impinge against the foil, a change in capacitance occurs which in turn causes a voltage change at the electrode. The voltage change is coupled through a capacitor and an amplifier and is then sent to recognition logic means where the signals are evaluated for magnitude of the voltage change at the synthetic foil and for the time of impingement of the ink droplet.

In view of the above discussion, the principal object of the present invention is to provide means for sensing the impinging of ink droplets on record media and the pulse caused by the ink droplet.

Another object of the present invention is to provide means for sensing the ink droplets on the record media in printing operations and detecting certain parameters or conditions of the printing operation.

An additional object of the present invention is to provide sensing means for detecting printing errors and initiating means for monitoring the operation of the printer.

A further object of the present invention is to provide a printing system whereby ink droplets are caused to be driven toward the record media for depositing ink in dot matrix manner and electrostatic means is provided for sensing the ink droplets and monitoring or testing the ink droplet operation.

Additional advantages and features of the present invention will become apparent and fully understood from a reading of the following description taken together with the annexed drawing.

DETAILED DESCRIPTION OF THE INVENTION

Figure 1:
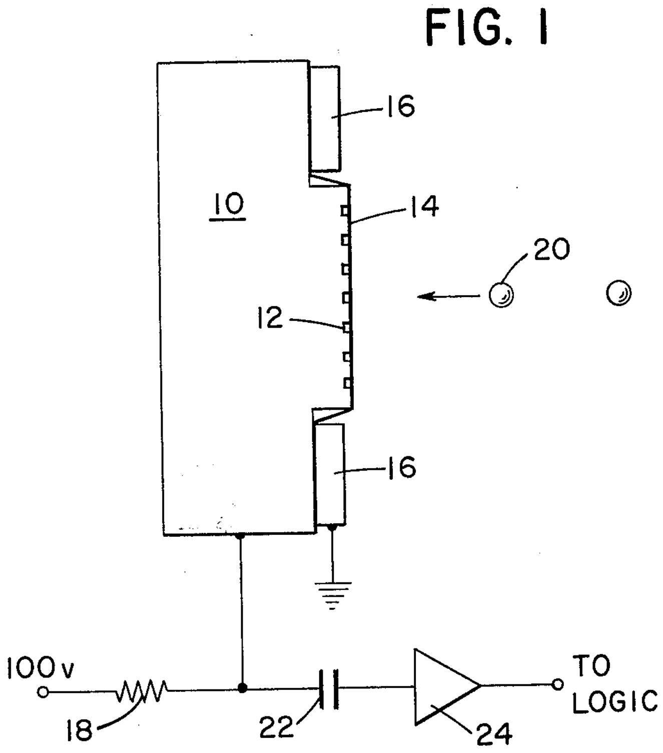
FIG. 1 shows a diagrammatic view of sensing means for detecting ink droplets.

FIG. 1 shows in diagrammatic form the design of an electrostatic foil converter for detecting ink droplets which are ejected from the nozzles of a print head of an ink jet printer. A counter electrode 10 in the form of a metallic block has a rough or uneven surface 12 consisting of grooves or like indentations. along a face portion of the electrode and corresponding to the column of nozzles in the print head. A thin sheet of synthetic foil 14 is covered or coated with a layer of gold, aluminum, copper or like conductive material, and is stretched across the surface 12 and secured to the electrode by means of a ring 16. The synthetic foil 14 serves as a dielectric and also as an insulator between the electrode 10 and the metallic layer or coating. A direct voltage of 100 volts is supplied through a resistor 18, having a value of 5 megohms, and is connected to apply voltage between the metal layer of the foil 14 and a connecting portion of the electrode 10.

Droplets 20 of ink from the print head are caused to be impinged against the foil 14 and cause a momentary deflection of the foil by reason of the rough surface 12. The deflection of the foil 14 causes a change in capacitance which in turn causes a voltage change at the counter electrode 10 in view of the momentary charge. This voltage change is coupled through a capacitor 22 and a preamplifier 24 to be transmitted to recognition type logic where the voltage change is evaluated in dependence on signals which are to be expected and which signals are utilized in well-known manner in regard to monitoring the printer operation. The recognition logic utilizing the voltage changes coming from the sensing means monitors proper ink jet operation and can initiate certain corrective or warning actions, such actions indicating and/or providing for wiping and cleaning the face plate of the print head, or sounding an alarm or adjusting the voltages applied to ink droplet drive elements. In well-known manner, the monitoring function may be performed upon operator request or automatically at regular intervals, for example, at the end of each line, at the end of each printed page, or after a predetermined plurality of printed lines or pages. It is here noted that the recognition logic and corrective action may correspond to an arrangement disclosed in a copending application Ser. No. 197,714, filed Oct. 16, 1980 entitled Optical Sensing of Ink Jet Printing.

The magnitude of the voltage pulse on the synthetic foil 14 depends on the electrical values of resistance and applied voltage and on the mechanical parameters of the impinging ink droplet such as the velocity and mass of the ink droplet 20. The impinging of the ink droplet 20 onto the foil 14 initiates or generates the leading edge of the voltage change which is detected by the circuitry. Thus the time of impingement of the ink droplet 20 and the pulse caused thereby can be detected.

Figure 2:
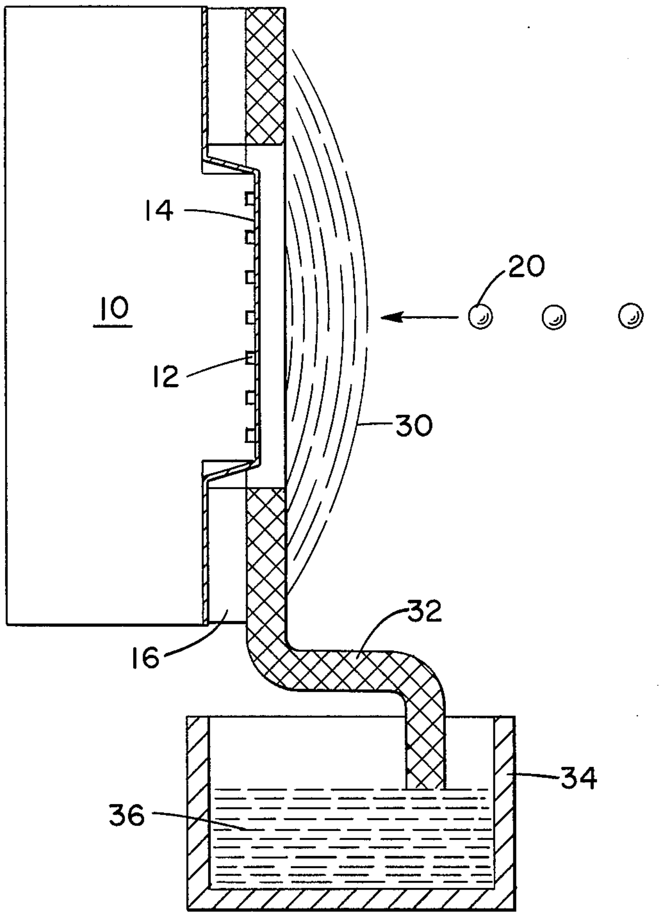
FIG. 2 is a view of the sensing means with means for preventing drying of the ink.

FIG. 2 shows the counter electrode 10 with the rough surface 12 and with the foil 14 stretched thereacross and secured by the ring 16. The ink droplets 20 are directed toward the metallic covered foil in the manner and with the result as described in FIG. 1. An ink solvent atmosphere 30 is established or created adjacent the foil 14 and the in path of the ink droplets 20 by means of an absorbent felt member 32. The member 32 is trained around the rough surface 12 to provide the atmosphere 30 for the purpose of preventing drying of the ink on the metal plated foil 14. The member 32 is placed with one end thereof in a container 34 of solvent 36 and in a manner wherein the ink droplets remain moist and flow downwardly along the foil 14 and onto the felt. Such an absorbent member may not be required where the ink is of a consistency that the ink can remain on the foil layer without drying or in the case where the ink solvent is not absorbed by the felt.

Figure 3:
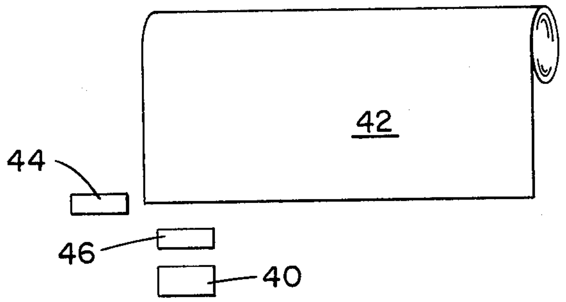
FIG. 3 is a view showing a sensing device in each of two positions relative to a printing element.

FIG. 3 shows in diagrammatic form the operation of the electrostatic sensor in connection with an ink jet print head 40 and the paper 42 on which printing is to be performed. Detection of the ink droplets can be accomplished by placing an electrostatic sensor 44 outside the margin of the paper 42 or to the left thereof and the print head 40 is caused to travel beyond the paper to enable sensing the ink droplets. In this arrangement and after completion of each line of printing the ink jet print head 40 runs over the sensor 44 and a monitor signal is generated which is characteristic of the impinged ink droplet.

Another arrangement of the detection or sensing means is shown in FIG. 3 wherein an electrostatic sensor 46 is placed within the margin of the paper 42 and the sensor is moved directly with the print head 40. In this manner no extra movement of the print head 40 is necessary for monitoring or testing the impingement of the ink droplets. An additional movement of the sensor 46 is necessary to uncover the print head 40 for printing or to cover the print head for a test step. When the printer is at rest the sensor 46 may serve as a cover member for protecting the print head against dust or drying of the ink at the nozzles.

Figure 4:
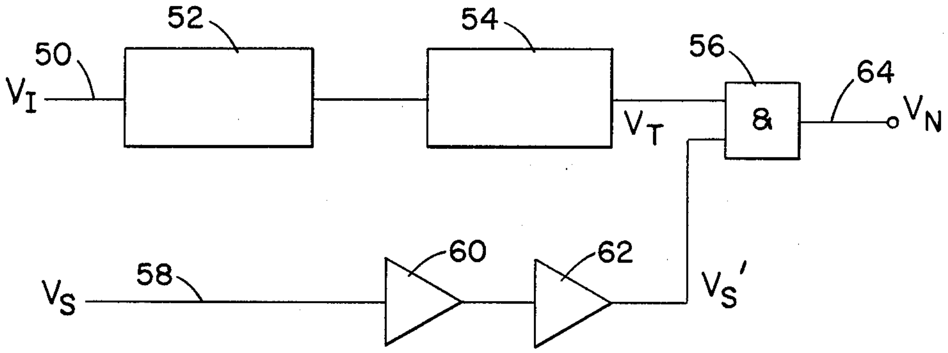
FIG. 4 is a circuit showing a form of noise suppression for the sensing device.
Figure 5:
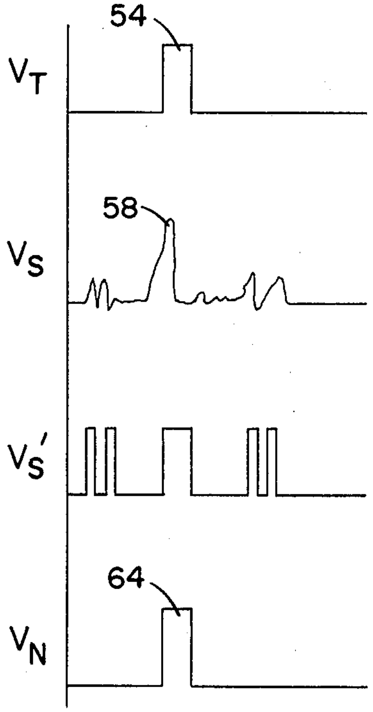
FIG. 5 is a pulse diagram showing the time relationship in the noise suppression of the sensor.

FIG. 4 shows a circuit employing a time mask and FIG. 5 shows a corresponding pulse diagram for accomplishing a logical decision for filtering out noises from the electrostatic sensor 44 or 46 (FIG. 3). An initiating pulse 50 or voltage $V_I$ is generated through a time window 52 in the form of a monostable multivibrator and then through an adjustable window 54 also in the form of a multivibrator to serve as one input ($V_T$) of an AND gate 56. A pulse or ink droplet signal 58 or voltage $V_S$ is sent from the electrostatic sensor 44 or 46 through limiting amplifiers 60 and 62 and serves as the other input $V_S'$) of the AND gate 56 which has an output signal 64 or voltage pulse $V_N$. The time window 52 is generated by determining the time of propagation of the signals within the ink channel of the print head and a narrow detection time reduces the noise sensitivity of the electrostatic sensor. The use of a time mask for noise suppression of the sensor relates to the timing and coding of the successive emission of ink droplets by a plurality of sensors, as disclosed below. An initiating signal 50 or voltage pulse $V_I$ from the character generator triggers a time signal of length $t_1$ in the multivibrator 52 which signal length is equal to the electrical delay seen during ink droplet emission pulse time of flight of the droplet from the nozzle to the foil 14. After time $t_1$, the multivibrator 54 is triggered to emit a pulse $V_T$ of a length $t_2$ corresponding to the impact duration of the droplet on the sensor 44 or 46.

The signal 58 or voltage pulse $V_S$ transmitted from the sensor consists of the signal to be recognized or detected plus any noise distrubance, so that the signal 58 includes a time delay $t_1$ and a length $t_2$. It is only when this condition is true that an output signal 64 or voltage pulse $V_N$ is generated by the AND gate 56, and noise suppression is achieved.

Figure 6:
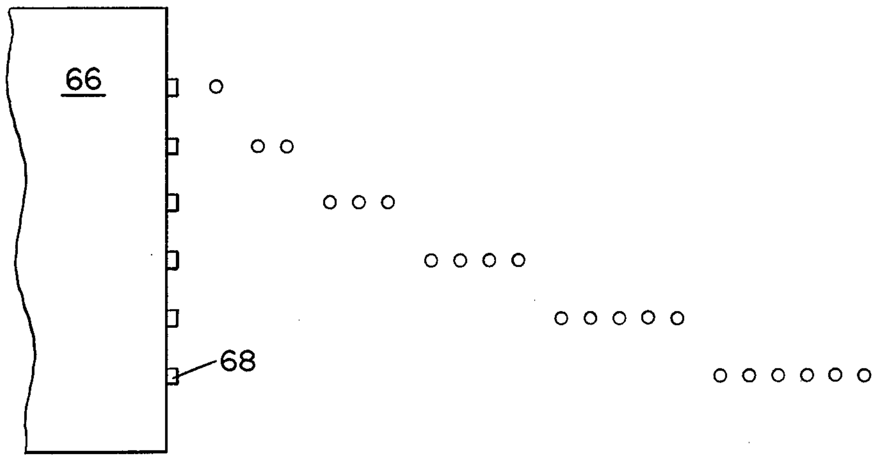
FIG. 6 is a view showing a plurality of ink droplets being ejected from the nozzle of the printing element.
Figure 7:
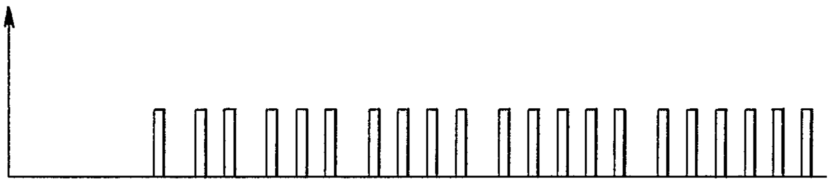
FIG. 7 is a pulse diagram of the arrangement for identifying the nozzles for a plurality of ink droplets.

FIG. 6 shows a print head 66 with a plurality of nozzles 68 in an arrangement wherein it is sufficient to use only one electrostatic sensor for testing all the nozzles. A coding of the individual nozzles 68 enables a detecting of the proper operation of all the nozzles or for the detection of errors in the ejection of ink droplets from one or more of the nozzles. In this case the top nozzle ejects one droplet, the next nozzle two droplets, and so forth with the coded pulse pattern for identifying the individual nozzles shown in the timing pattern of FIG. 7. Any suitable method such as a single timing operation for correlating the individual output signals of the sensor with a respective nozzle may likewise be used in the sensing operation.

Figure 8:
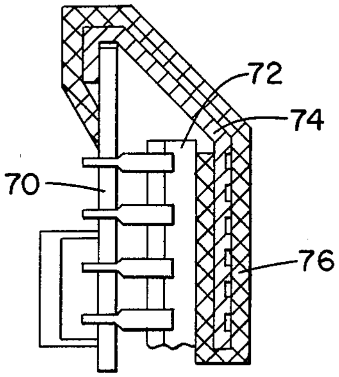
FIG. 8 is a view of an arrangement of the electronic components connected with the sensing device.

FIG. 8 shows an arrangement permitting a compact design of the sensing apparatus and a high electromagnetic noise suppression in an instance wherein the high resistance line, designated as 58 in FIG. 4, is of short length. The arrangement in FIG. 8 uses a preamplifier which may be an integrated circuit performing as a counter electrode to enable the advantages of a stable design and short supply lines. A support plate 70 including normal electrial components and printed leads carries an integrated circuit 72 as a supporting member for the counter electrode 74 which electrode takes the form of sheet metal having a rough surface at a face portion thereof. A metallic foil 76 is secured to the support plate 70 and is stretched across the rough surface of the electrode 74 and is secured on the back side of the counter electrode.

Figure 9:
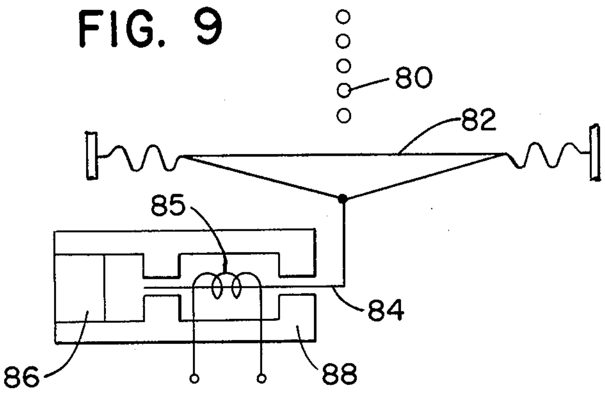
FIG. 9 is a view showing a modification of means for detecting ink droplets.

FIG. 9 shows a schematic arrangement of an electromagnetic microphone for detecting ink droplets 80 and including a membrane 82 suitably supported and connected with a rotatable read armature 84 which is positioned through a coil 85 and operably associated with a permanent magnet 86 and a soft iron core 88. Since the operation of a microphone apparatus is well-known, it is seen that whenever ink droplets 80 impact on the membrane 82, the generated voltage changes are input to the recognition logic and are used in corrective or warning actions as described above.

Figure 10:
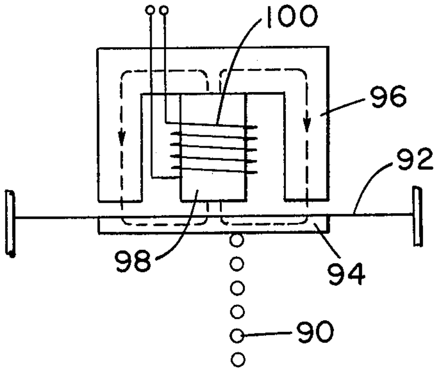
FIG. 10 is a view showing a further modification of ink droplets detecting means.

FIG. 10 shows a modified arrangement of an electromagnetic microphone for detecting ink droplets 90 and including a membrane 92 suitably supported in an air gap between an armature 94 and a soft iron core 96 operably associated with and surrounding a permanent magnet 98 and a coil 100. The impact of droplets 90 against the membrane 92 generates voltage changes for input to the recognition logic as mentioned just above.

Figure 11:
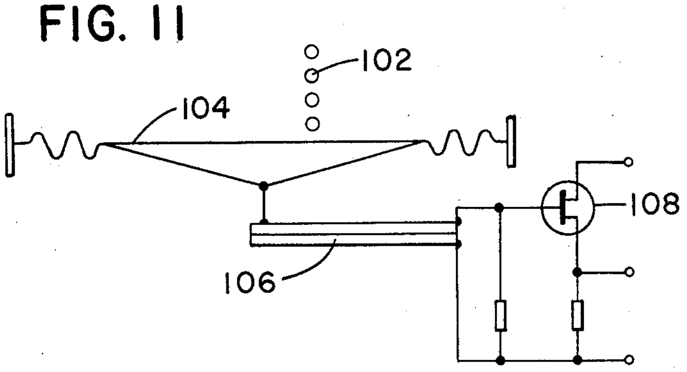
FIG. 11 is a view showing a still-further modification of ink droplet detecting means.

FIG. 11 shows another arrangement of a ceramic microphone for detecting ink droplets 102 and including a membrane 104 suitably supported and connected with a piezo ceramic bending oscillator 106. The oscillator 106 is operably connected in an impedance matching stage arrangement which includes a field effect transistor 108. Likewise, the droplets 102 impact against the membrane 104 and generate the voltage changes.

Another possibility as an alternative to the use of the metallic foil 14, as shown in FIGS. 1 and 2, is the use of an electret converter which has an electric polarity sufficient for detection of the ink droplets. The electret converter can use either synthetic foils or thin layers of piezo ceramic materials. While the electret converters or transducers are commercially available, they eliminate the need for the high applied voltage and the large resistance in the detection circuit and thus are considered to be unique in detecting or sensing ink droplets.

The application of an electrical sensor offers an early opportunity to detect failure of the ink jet printing which may take the form wherein (1) the ink droplet does not impinge on the foil, (2) the impact of the ink droplet on the foil is too small to cause the required electrical pulse, or (3) the ink droplet does not impinge on the foil at the proper time, that is, the propagation time of the electrical signals and the time of the pressure waves in the ink jet printing device are too large. The first and the third failure indications or forms may normally be removed or solved by activating a rinsing device for keeping the ink jet nozzles free and clear. The third indication may also be removed by means of controllable electrical delay elements or by using variable propagation times in the electrical signaling scheme. The second failure indication can usually be removed within certain limits by readjusting the energizing voltage for the piezo drive element.

A further application of the electrostatic sensor is in the detection of a defined geometric shape. A small sensor could detect changes in the configuration of the ink jet flow and a large electrostatic converter could be used with a hole pattern wherein the ink droplets are detected only if the impingement is in the exact geometrical configuration.

It is thus seen that herein shown and described is sensing apparatus for detecting failures in ink jet printing operation, which apparatus includes electrostatic means in the form of a foil across the surface of an electrode and wherein the impingement of the ink droplets on the foil generates a pulse indicative of a change in voltage. The apparatus of the present invention enables the accomplishment of the objects and advantages mentioned above and, while a preferred embodiment and several modifications thereof have been disclosed herein, other modifications may occur to those skilled in the art. It is contemplated that all such modifications and variations not departing from the spirit and scope of the invention hereof are to be construed in accordance with the following claims.

I claim:

1. Apparatus for detecting the presence of ink droplets comprising an
   electrode member having an uneven surface, an insulating sheet covering the uneven surface, said sheet having a conductive coating on one side thereof distal from the electrode member, and
   voltage means connected to said electrode and to the conductive coating and responsive to ink droplets impinging on and deflecting said insulating sheet thereby causing a change in voltage at the electrode to indicate the impact of the ink droplets and to generate a pulse in response thereto.

2. The apparatus of claim 1 wherein said electrode member is a metallic block having said uneven surface on one side thereof to receive impact of said ink droplets.

3. The apparatus of claim 1 wherein said electrode member includes a plurality of grooves on one face thereof.

4. The apparatus of claim 1 wherein said insulating sheet comprises a thin foil stretched across the uneven surface of the electrode member.

5. The apparatus of claim 1 wherein the insulating sheet includes a conductive layer of metal thereon.

6. The apparatus of claim 1 wherein said voltage means includes a resistor and a capacitor connected for causing a change in capacitance upon impact of ink droplets on said insulating sheet.

7. The apparatus of claim 1 including means adjacent the uneven surface of the electrode member for maintaining an atmosphere of moist air for preventing drying of ink droplets on the conductive coating.

8. In an ink jet printer having a print head and record media for receiving droplets of ink from said print head, means for detecting the presence of ink droplets comprising an
   electrode element positioned in relation to the print head to be impacted by ink droplets therefrom, a surface of said electrode element including a series of indentations to provide an uneven surface, a
   foil sheet covering the surface of said electrode element and having a conductive coating on one side thereof, and
   means connected with said electrode element for applying a voltage between the element and ground potential and responsive to impacting of ink droplets toward and against the foil sheet covering the indentations to cause a voltage change at the electrode element and generate a pulse in response to the change in voltage.

9. In the printer of claim 8 wherein said electrode element is a metallic block formed to receive impact of ink droplets on one surface thereof.

10. In the printer of claim 8 wherein the series of indentations are spaced to receive ink droplets from the respective column of nozzles of the print head.

11. In the printer of claim 8 wherein the foil sheet is an insulating medium stretched across the indentations of said surface.

12. In the printer of claim 8 wherein the foil sheet includes a conductive coating of metal thereon distal from the electrode element.

13. In the printer of claim 8 wherein said voltage applying means includes a resistor and a capacitor connected for causing a change in capacitance upon impact of ink droplets on said foil sheet.

14. In the printer of claim 8 including means adjacent the surface of said electrode element for maintaining a moist atmosphere for preventing drying of ink droplets on the conductive coating.

15. In the printer of claim 8 including circuit means for filtering noise from the ink droplet detecting means.

* * * * *